United States Patent [19]
Kuhn et al.

[11] 4,024,100
[45] May 17, 1977

[54] POLYSILOXANE MODIFIED COATINGS

[75] Inventors: Peter Kuhn, Krefeld; Karl Raichle, Krefeld-Bockum; Rolf Kuchenmeister, Krefeld; Bernd Peltzer, Krefeld-Bockum, all of Germany

[73] Assignee: Bayer Aktiengesellschaft, Germany

[22] Filed: Feb. 12, 1975

[21] Appl. No.: 549,365

[30] Foreign Application Priority Data

Feb. 16, 1974 Germany ............... 2407566

[52] U.S. Cl. ............... 260/30.4 N; 260/30.4 SB; 260/31.4 R; 260/32.2; 260/32.8 N; 260/32.8 SB; 260/33.4 SB; 260/33.6 SB; 260/826
[51] Int. Cl.² ............... C08K 5/00; C08L 43/04; C08L 83/10
[58] Field of Search ....... 260/826, 30.4 N, 30.4 SB, 260/31.4 R, 31.6, 32.2, 32.8 N, 32.8 SB, 33.4 SB, 33.6 SB

[56] References Cited
UNITED STATES PATENTS

| 3,425,974 | 2/1969 | Semroc | 260/826 |
| 3,668,276 | 6/1972 | Riemhofer et al. | 260/826 |
| 3,852,375 | 12/1974 | Biethan et al. | 260/826 |

OTHER PUBLICATIONS 726,694  3/1955  United Kingdom ............ 260/826

Primary Examiner—Allan Lieberman
Attorney, Agent, or Firm—Connolly and Hutz

[57] ABSTRACT

Highly deformable coatings which are capable of being deep drawn and which are persistent to sterilization can be obtained by using a binder which comprises a mixture of 5 – 30 parts by weight of a benzoguanamine resin and 95 – 70 parts by weight of a polyester which contains o-phthalic acid groups, dihydric and/or trihydric alcohols modified by a polysiloxane of the formula

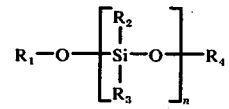

wherein $n$ is from 2 to 5, $R_1$ and $R_4$ are alkyl having 1 to 4 carbon atoms, phenyl, tolyl or benzyl and $R_2$ and $R_3$ are alkyl having 1 to 4 carbon atoms, alkoxy having 1 to 4 carbon atoms, phenyl, tolyl or benzyl.

9 Claims, No Drawings

POLYSILOXANE MODIFIED COATINGS

This invention relates to materials which give rise to highly deformable coatings which are capable of being deep drawn and which are resistant to sterilisation, comprising a mixture of benzoguanamine resins and polysiloxane modified polyesters which contain o-phthalic acid groups, to which may be added at least one organic solvent, pigment a filler and/or other of the usual auxiliary agents and additives used for coating.

It is already known to produce coatings from hydroxyl polyesters in combination with cross-linking components such as amino resins.

These coatings are distinguished by their high flexibility, surface hardness and resistance to yellowing and can withstand deformations of a coated workpiece such as bending, deep drawing, flanging and punching without peeling off or cracking. The coatings have, however, the serious disadvantage that they are not resistant to sterilisation. When exposed to steam at 120° C they become detached from the substrate and form blisters, irreversible matt patches and cracks which severely restrict the usefulness of the coatings. German Offenlegungsschrift No. 1,807,776 describes the production of highly deformable and sterilisation resistant coating materials by heat hardening benzoguanamine resins with high molecular weight, saturated linear polyesters, in which the polyester portion contains residues of iso- and terephthalic acid, optionally in addition to residues of suitable aliphatic dicarboxylic acids and diols.

The solubility of these high molecular weight coatings, however, is not sufficient to meet all the requirements of modern application techniques. Another disadvantage lies in the difficulties encountered in the preparation of the high molecular weight polyesters, which are due to the difficulty of dissolving terephthalic acid and which increase the production costs. The use of a terephthalic acid derivative which is capable of undergoing ester interchange, such as dimethylterephthalate, has the disadvantage of requiring the use of special catalysts and suitable vacuum distillation apparatus as described in German Offenlegungsschrift No. 2,216,732, page 1.

On the other hand, oil-free polyesters which contain residues of terephthalic acid and/or isophthalic acid have been described as being particularly suitable for the production of highly deformable coatings as described in German Offenlegungsschrift No. 1,669,104 and 2,108,881, whereas o-phthalic acid is said not to satisfy the requirements of such coating systems as lescribed in German Offenlegungsschrift No. 2,108,881, page 9.

Binders which are modified with polysiloxanes to improve the resistance to weathering have been known for some time but a satisfactory increase in the resistance to weathering is achieved only with polysiloxane contents of more than 30% by weight, based on polyester as described in ACS, Org. Coat and Plast. Chem. 29, No. 1, page 143 (1969) and Fahrzeug and Metall-Lackierer, No. 3, page 56 (1967).

It is an object of the present invention to produce binders which combine extreme deformability with high resistance to steam under sterilisation conditions while avoiding the above described disadvantages of saturated polyesters.

It has now surprisingly been found that the required properties of high deformability and resistance to sterilisation conditions can be obtained with coatings in which the polyester component contains residues of o-phthalic acid and is modified with polysiloxane.

The invention therefore relates to highly deformable, deep drawable and sterilisation resistant coatings comprising mixtures which contain 5 to 30 parts by weight of aminoplasts based on a benzoguanamine resin and 95 to 70 parts by weight of a polyester which contains residues of aromatic and aliphatic dicarboxylic acids and residues of dihydric and optionally trihydric alcohols to which at least one organic solvent, pigment, filler and/or other of the usual auxiliary and additives used for coatings may be added characterised in that polyesters in which
- 100 to 40 mols % of the aromatic dicarboxylic acid residues consist of o-phthalic acid; and
- 85 to 100 mols % of the residues of diols and triols consist of dihydric alcohols and 0 to 15 mols % thereof consist of trihydric alcohols; and
- the polyesters are modified with such quantities of a polysiloxane that 100 parts by weight of the modified polyester contains 1 to 11 parts by weight, preferably 1 to 8 parts by weight and in particular 2 to 6 parts by weight of residues of a polysiloxane.

The invention further relates to a process for the preparation of such mixtures.

The component comprising residues of aromatic dicarboxylic acids and residues of aliphatic dicarboxylic acids in the polyester consists of 85 to 50 mols %, preferably 80 to 60 mols % and most preferably 75 to 65 mols % of aromatic dicarboxylic acids and 15 to 50 mols %, preferably 20 to 40 mols % and most preferably 25 to 35 mols % of aliphatic dicarboxylic acid.

Preferably 100 to 70 mols % and most preferably 100 mols % of the residues of aromatic dicarboxylic acids consist of o-phthalic acid.

Preferably 90 to 100 mols % and most preferably 95 to 100 mols % of the residues of diols and triols consists of diols and 0 to 10 mols %, most preferably 0 to 5 mols % of triols.

Higher proportions of polysiloxanes have a bad effect on the coatings according to the invention and in particular on the levelling properties, gloss, elasticity and resistance to sterilisation.

Suitable aliphatic dicarboxylic acids include e.g. succinic acid, glutaric acid, adipic acid, pimelic acid, suberic acid, sebacic acid, decane dicarboxylic acid, dodecane dicarboxylic acid and 2,2,4-trimethyl adipic acid.

The aromatic dicarboxylic acids may also be other benzene dicarboxylic acids than o-phthalic acid, e.g. isophthalic acid or terephthalic acid or also tetrahydrophthalic acid or naphthalene dicarboxylic acids.

Suitable diol components are e.g. ethane diol, propane-1,2-diol, propane-1,3-diol, butane-1,2-diol, butane-1,3-diol, butane-1,4-diol, 2,2-dimethylpropane-1,3-diol, 2-ethylpropane-1,3-diol, hexanediols, 2-ethylhexane-1,3-diol, cyclohexane-1,2-diol, cyclohexane-1,4-diol, 1,2-bis-hydroxymethyl-cyclohexane and bis-hydroxymethyl-cyclohexane-(1,4).

Perhydrobisphenol, bis-oxal-hydrobisphenols of the formula

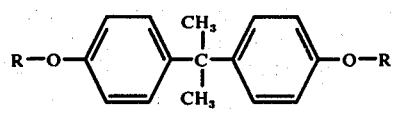

in which the groups R may be the same or different and represent a $C_2H_4OH$ or $C_3H_6OH$ group, diethylene glycol, triethylene, glycol, dipropylene glycol and tripropylene glycol may be used.

The following trihydric alcohols may be used, for example: Glycerol, trimethylopropane, trimethylolethane, butane-1,2,4-triol and hexane-1,2,6-triol.

Coatings with exceptionally advantageous properties are obtained when bis-hydroxyethylbisphenol or bis-hydroxypropylbisphenol is used as one of the diol components and/or the triol component consists exclusively of glycerol.

The polysiloxanes used may be compounds conforming to the following general formula:

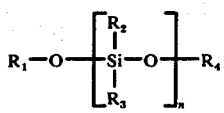

wherein $n$ preferably represents the numbers 2 to 5, $R_1$ and $R_4$ represent straight and/or branched chain alkyl groups with preferably 1 to 4 carbon atoms, phenyl, tolyl and/or benzyl, $R_2$ and $R_3$ represent straight and/or branched chain alkyl groups with preferably 1 to 4 carbon atoms, straight chain and/or branched chain alkoxy groups with preferably 1 to 4 carbon atoms, phenyl, tolyl, and/or benzyl.

The following are examples of straight or branched chain alkyl and alkoxy groups: Methyl, ethyl, propyl, isopropyl, butyl, isobutyl, methoxy, alkoxy, propoxy, isopropyloxy, butoxy and isobutyloxy.

Polysiloxanes in which n represents 2 to 4, $R_2$ and $R_3$ represent phenyl, methyl and/or methoxy and $R_1$ and $R_4$ represent methyl and/or phenyl are preferred. This type of polysiloxane has been described, for example, in Fatipec-Congress 1970, page 172 and by L. H. Brown, ACS, Org. Coat. und Plast. Chem. 29, (1969), No. 1, page 135.

The aminoplast components used for producing the coatings according to the invention may be benzoguanamine resins or their low molecular weight precursors such as dimethylolbenzoguanamine, trimethylolbenzoguanamine and tetramethylolbenzoguanamine which may be partly or completely etherified with methanol, ethanol, propanols or butanols, as well as their low molecular weight reaction products with diols and polyols or with oligo ester polyols.

Tetramethylolbenzoguanamines which are partly etherified with alcohols which contain 1 to 4 Carbon atoms are particularly preferred.

The polyester components of the coating materials according to the invention may, if desired, be prepared with the aid of the usual polycondensation catalysts such as those described in the following literature, for example: V. V. Korshak and S. V. Vinogradova: Polyesters page 123 et seq and H. Wagner and H. F. Sarx, Lackkunstharze, C. Hanser-Verlag 5th Edition, 1971, page 90 and W. R. Sorenson and T. W. Campbell, Preparative Methods of Polymer Chemistry, Instersc. Publ. New York 1961, 111-127 and the references quoted there.

The advantageous properties of the coatings according to the invention do not, however, depend on the use of such catalysts.

Catalysts may also be advantageous for the reaction of the polyesters with the polysiloxanes, but here again the use of these catalysts does not determine the properties of the finished coatings. Catalysts suitable for this purpose include e.g. soluble salts of cobalt, zinc, manganese, lead, tin and titanium. Tetralkyltitanates containing 2 to 5 Carbon atoms in the carbon chain such as tetraethyltitanate, tetraisopropyltitanate, tetrapropyltitanate, tetraisobutyltitanate and tetrabutyltitanate and particularly suitable for this purpose.

Suitable hardening catalysts such as hydrochloric acid, phosphoric acid, sulphuric acid, oxalic acid, benzene sulphonic acid, toluene sulphonic acids and their salts with bases which are volatile at elevated temperature such as ammonia, mono-, di- and trilkylamines, dimethylformamide, morpholine, dimethylacetamide or N-methylpyrrolidone may be used for producing coatings from the coating materials according to the invention, but these hardening catalysts are not necessary for obtaining the advantageous properties of the products according to the invention.

If desired, pigments such as titanium dioxide, carbon black, talcum, barium sulphate, zinc sulphate, strontium chromate, barium chromate, molybdenum red, iron yellow, iron red, iron black or hydrated iron oxides, or pigments such as cadmium yellow or cadmium red or organic pigments and metal complex dyes and similar substances may be added to the coating materials by the usual methods to obtain coatings of the desired colour, but the properties of the coating materials according to the invention is independent of any addition of pigment.

The following are examples of fillers which may be added if desired, but the properties of the coatings according to the invention do not depend on the addition of filler: Heavy spar, quartz sand, kaolin, microtalcum and micro horn blend.

Other suitable auxiliary agents and substances which may be added include levelling agents such as polyvinyl butyral or silicone oils; matting agents such as colloidal silicic acid; antisettling agents, defoaming agents and other of the usual auxiliary agents and additives which have been introduced into the lacquer industry. The advantageous properties of the coatings according to the invention are not achieved by means of such auxiliary agents and additives.

The coating materials according to the invention are soluble in organic solvents or mixtures of solvents such as methyl ethyl ketone, methyl isobutyl ketone, dioxane, cyclohexanone, isophorone, diisopropylketone, carbitol acetate, butyl carbitol, methyl cyclohexanone, diacetone alcohol, ethyl glycol, methyl glycol, butyl glycol, butyl glycollate, methyl glycol acetate, ethyl glycol acetate, butyl glycol acetate and butyl carbitol acetate and mixtures of the above mentioned solvents with aromatic solubilizers such as xylene and aromatic solvents with a boiling range of 180° to 210° C., and they are preferably used in the form of these solutions.

The coating materials according to the invention may be applied by any of the usual application methods employed in lacquering techniques such as spraying, immersion, flooding or rolling. The substrates for which the coating materials are intended are mainly metals, particularly steel sheet, deep drawn sheets and galvanized steel sheet but also aluminum sheet. The coating materials according to the invention are particularly advantageous for lacquering metal tape.

The coating materials according to the invention can be heat hardened by the usual methods at temperatures of 100° to 300° C., preferably 160° to 300° C.

The linear or slightly branched polyesters may be prepared by any of the usual methods such as melt condensation or azeotropic condensation in the usual apparatus, with or without catalysts and with or without the passage of a stream of inert gas, by heating the dicarboxylic acids, diols and optionally polyols at temperatures of between 160° and 280° C while the water of reaction is continuously removed. Melt condensation and a temperature range of 180° to 260° C. are preferred. Esterification proceeds almost quantitatively and can be followed by determining the acid number and viscosity. The reaction conditions are chosen to produce a final acid number of 2 to 20 and final viscosity of 150 to 350 sec (50% in ethyl glycol acetate, outflow cup according to DIN 53 211, 20° C).

The preferred range of acid numbers is between 5 and 15 and the preferred viscosity range between 180 and 260 sec.

The reaction of the polyesters prepared in this way with the polysiloxanes may also be carried out in the melt at 160° to 200° C., but the reaction may also be carried out in solvents at lower temperatures, i.e. between 80° and 160° C., preferably 100° to 140° C. Both these methods may be carried out either with or without catalysts.

After the reaction with polysiloxanes, the modified polyesters are dissolved in suitable solvents to produce solutions with solids contents of between 40 and 70%.

The ratio of pigment to binder may vary within wide limits, for example when titanium dioxide is used as pigment, the following ratios may be employed: Binder:pigment = 1:0.8 to 1:2. In accordance with the present state of the art, these ratios may be considerably varied for other pigments with higher covering power.

In addition to the numerous remarkable properties such as high glass, good pigment absorption and resistance to yellowing, the coatings obtained are particularly distinguished by their high deformation elasticity and resistance to sterilisation.

Cup Test, Beading Test

The deformation elasticity and capacity to be deep drawn are tested by the cup drawing test in which a disc is punched out of a lacquered metal sheet and drawn out to form a circular standard cup, e.g. with an internal diameter of 33 mm and height of 25 mm, in one operation (Deutsche Forschungsgesellschaft fur Blechverarbeitung und Oberflachenbehandlung e.V. Dusseldorf; DFBO-Mitteilungen, March 1971, Volume 33, No.3, page 41 et seq.). In this test, the appearance of the lacquered cup is assessed with regard to loss of adherence of the coating, formation of cracks, etc. If no negative findings are made, the test cup is assessed as being capable of being deep drawn.

To subject the cup to further stress, a beading is then turned in the cylindrical wall of the cup. In this beading test, the depth of the beading in millimeters at which the formation of cracks in the lacquer layer can just be observed is taken as a measure of the stretchability of the sample.

Sterilisation Test

The deep drawn standard cups are exposed to a steam atmosphere at 121° C., for 30 minutes in an autoclave and then tested for cracking, loss of gloss, loss of adherence and formation of wrinkles, blisters or patches, and if no negative findings are made the samples are assessed as resistant to sterilisation.

The following Examples serve to explain the nature of the invention in more detail.

Preparation of a polyester

EXAMPLE 1

426 Parts by weight of phthalic acid anhydride, 185 parts by weight of adipic acid, 281 parts by weight of ethylene glycol, 15 parts by weight of propylene glycol and 13 parts by weight of glycerol are heated to a temperature of 200° C., for 8 hours in a conventional solvent-free condensation apparatus and kept at this temperature under a stream of nitrogen and with continuous removal of the water of reaction formed until the acid number is 5 to 15mg of potassium hydroxide and the viscosity 180 to 260 sec (50% in ethyl glycol acetate, DIN cup).

EXAMPLE 2

225 Parts by weight of phthalic acid anhydride, 166 parts by weight of adipic acid, 188 parts by weight of isophthalic acid, 360 parts by weight of bis-oxethylbisphenol and 170 parts by weight of ethylene glycol are heated to a temperature of 230° C. within 10 hours in a conventional solvent-free condensation apparatus and kept at this temperature until the acid number is 5 to 15 and the viscosity 180 to 260 sec (50% in ethyl glycol acetate) while nitrogen is passed through the reaction mixture and the water reaction formed is removed continuously.

EXAMPLE 3

534 Parts by weight of phthalic acid anhydride, 232 parts by weight of adipic acid, 51 parts by weight of hexane- 1,6-diol, 261 parts by weight of ethylene glycol, 18 parts by weight of propylene glycol and 16 parts by weight of glycerol are reacted under the same conditions as described in Example 1 until the acid number is 10 to 20 and the viscosity 250 to 300 sec. (50% in ethyl glycol acetate).

EXAMPLE 4

1528 Parts by weight of phthalic acid anhydride, 1004 parts by weight of adipic acid, 1631 parts by weight of bis-oxethylbisphenol, 670 parts by weight of ethylene glycol, 52 parts by weight of propane-1,2-diol and 48 parts by weight of glycerol are reacted under the conditions of Example 1 until the acid number is 8 to 10 and the viscosity 230 to 280 seconds (40% in ethyl glycol acetate DIN cup).

EXAMPLE 5

1480 Parts by weight of phthalic acid anhydride, 630 parts by weight of adipic acid, 1820 parts by weight of bis-oxethylbisphenol, 425 parts by weight of ethane diol and 159 parts by weight of glycerol are reacted under the conditions of Example 1 until the acid number is 8 to 18 and the viscosity 200 to 250 seconds (50% in ethyl glycol acetate, DIN cup).

Modification with a polysiloxane

EXAMPLE 6

95 Parts by weight of one of the polyesters of Examples 1 to 5 are reacted with 5 parts by weight of a commercial trisiloxane resin containing methoxyl groups at 180° to 200° C. for 6 hours in a stirrer apparatus through which a stream of nitrogen is passed. The modified polyester is then dissolved to form a 40 to 70% solution in a 9:1 mixture of ethyl glycol/aromatic solvents which have a boiling range of 185° to 200° C. (Solvesso 150, manufacturers: Esso).

EXAMPLE 7

300 Parts by weight of one of the polyesters of Examples 1 to 5 are stirred up in a mixture of 999 parts by weight of ethyl glycol acetate and 666 parts by weight of an aromatic solvent with a boiling range of 185° to 200° C. (Solvesso 150, manufacturers: Esso) at 120° C for 6 hours after the addition of 93 parts by weight of a trisiloxane resin containing methoxyl groups and 0.03% by weight of butyl titanate, a weak stream of nitrogen being passed through the reaction mixture at the same time, and the modified product is then filled into containers.

Preparation of a White Lacquer

One of the polysiloxane modified polyester resins is mixed in proportions of 85:15 (based on the solid resin) with a benzoguanamine resin and the mixture is then triturated with titanium dioxide in a proportion of binder (calculated as solid resin) to pigment of 1:1.25 in a rolling mill. After the addition of 0.2% (calculated as solid) of the morpholine salt of p-toluene-sulphonic acid, the mixture is used to coat deep drawn sheet metals 8mm in thickness in such a way that white lacquer films which have a thickness of 5 to 25u when dry are obtained after stoving (3 minutes, 220° C.).

Performance test carried out on the white lacquer:

| No. | Polyester of Example No. | Siloxane Content % | Cupping Test | Beading Test mm | Pencil Hardness | Sterilisation |
|---|---|---|---|---|---|---|
| 1 | 1 | 3 | Capable of being deep drawn | 0.7 | HB | Can be Sterilised |
| 2 | 2 | 5 | " | 0.7 | HB | " |
| 3 | 3 | 3 | " | | HB | " |
| 4 | 1 | 10 | " | | HB | " |
| 5 | 4 | 3 | " | 0.90 | HB | " |
| 6 | 5 | 3 | " | 0.40 | HB | " |
| 7 | 3 | 15 | " | | HB | Cannot be Sterilised |

We claim:

1. A composition containing 5 to 30 parts by weight of an aminoplast which is based on a benzoguanamine resin and 95 to 70 parts by weight of a polysiloxane modified saturated polyester which is the condensation product of aromatic and aliphatic dicarboxylic acids, at least one polyol having up to three hydroxyl groups and a polysiloxane, from 100 to 40 mol % of said aromatic dicarboxylic acid being o-phthalic acid, from 85 to 100 mol % of said polyol being a diol and from 0 to 15 mol % of said polyol being a triol, said polysiloxane being of the formula:

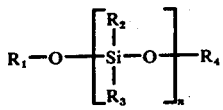

wherein $n$ is from 2 to 5, $R_1$ and $R_4$ are alkyl having 1 to 4 carbon atoms, phenyl, tolyl or benzyl, and $R_2$ and $R_3$ alkyl having 1 to 4 carbon atoms, alkoxy having 1 to 4 carbon atoms, phenyl, tolyl or benzyl and 100 parts by weight of the polysiloxane modified polyester contain 1 to 11 parts by weight of the polysiloxane and said polysiloxane modified saturated polyester being dissolved in a solvent to produce a solution having a solids content of from 40 to 70%.

2. The composition according to claim 1, which are characterised in that 100 parts by weight of the polysiloxane modified polyester contain 1 to 8 parts by weight of polysiloxane.

3. The composition according to claim 1 characterised in that 100 parts by weight of the polysiloxane modified polyester contain 2 to 6 parts by weight of polysiloxane.

4. The composition according to claim 1, characterised in that it contains bis-oxethylbisphenol groups as one of the diol components in the polyester portion.

5. The composition according to claim 1, characterised in that 100 to 70 mols % of the aromatic carboxylic acid groups in the polyester consist of o-phthalic acid.

6. The composition according to claim 1, characterised in that the aromatic carboxylic acid groups in the polyester consist exclusively of o-phthalic acid.

7. The composition according to claim 1, characterized in that 90 to 100 mols % of said polyol is a diol and from 0 to 10 mol % thereof is a triol.

8. The composition according to claim 1, characterized in that 95 to 100 mols % of said polyol is a diol and from 0 to 5 mol % thereof is a triol.

9. The composition according to claim 1, characterized in that the sole triol component of said polyester is glycerol.

* * * * *